United States Patent [19]

Kuwahara

[11] Patent Number: 5,294,999
[45] Date of Patent: Mar. 15, 1994

[54] METHOD AND APPARATUS FOR RECORDING A PLURALITY OF FACSIMILE COMMUNICATION RESULTS ON PAPER

[75] Inventor: Tetsuya Kuwahara, Shiga, Japan

[73] Assignee: Murata Kikai Kabushiki Kaisha, Kyoto, Japan

[21] Appl. No.: 710,701

[22] Filed: Jun. 5, 1991

[30] Foreign Application Priority Data

Jun. 7, 1990 [JP] Japan ................................ 2-149507

[51] Int. Cl.$^5$ ............................................. H04N 1/00
[52] U.S. Cl. ................... 358/441; 358/444; 358/404; 358/434
[58] Field of Search ............... 358/441, 404, 406, 444, 358/449

[56] References Cited

U.S. PATENT DOCUMENTS

| 4,494,149 | 1/1985 | Furakawa | 358/404 |
| 4,706,127 | 11/1987 | Nobuta | 358/449 |
| 4,814,893 | 3/1989 | Katoh | 358/449 |
| 5,057,937 | 10/1991 | Muramatsu et al. | 358/449 |
| 5,103,318 | 4/1992 | Takaska | 358/404 |
| 5,177,620 | 1/1993 | Fukushima | 358/404 |

FOREIGN PATENT DOCUMENTS 236565A 11/1985 Japan ................................ 358/441

Primary Examiner—Stephen Brinich
Assistant Examiner—Fan Lee
Attorney, Agent, or Firm—Spensley Horn Jubas & Lubitz

[57] ABSTRACT

A facsimile apparatus which produces no margin on a recording paper in the communication control recording. The predetermine number according to the size of the recording paper used is set and the communication results are recorded on a recording paper when the number of communication results reaches the predetermined number.

5 Claims, 4 Drawing Sheets

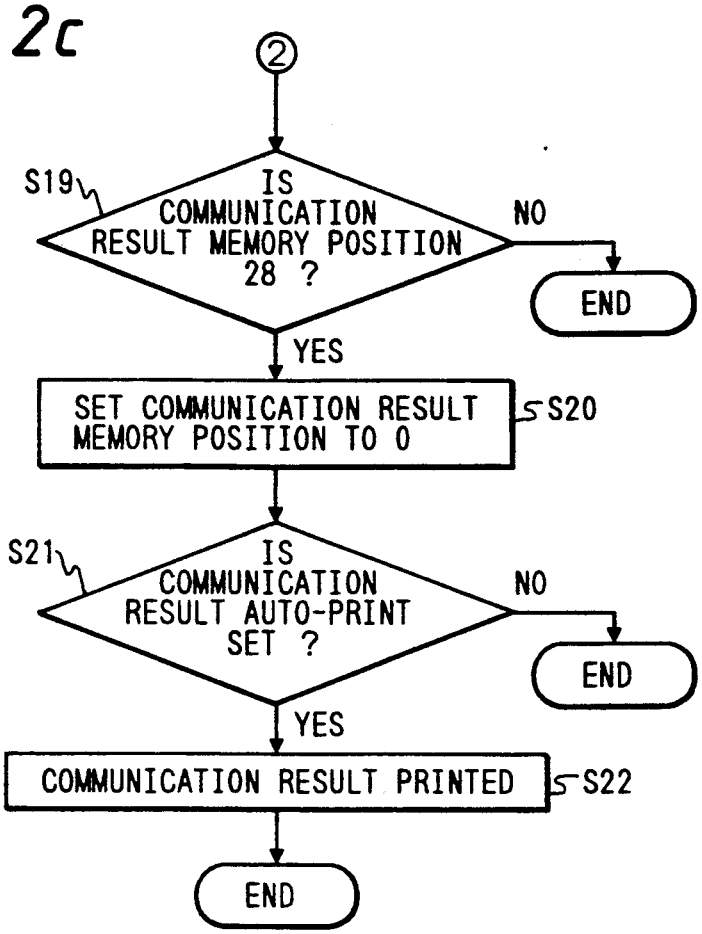

METHOD AND APPARATUS FOR RECORDING A PLURALITY OF FACSIMILE COMMUNICATION RESULTS ON PAPER

FIELD OF THE INVENTION

The present invention relates to a facsimile apparatus which, when transmission and reception are executed by a facsimile, sequentially stores the communication results, and records a predetermined number of the communication results on a paper when said communication results reaches a predetermined number.

RELATED ART STATEMENT

When transmission and reception are executed by a facsimile, the communication results thereof are stored in RAM as communication control records. The communication results in excess of the memory capacity of RAM cannot be stored. Therefore, for example, when the number of communication results reaches 25, old communication results are erased, and new communication results are stored. In this case, the communication results to be erased are recorded on the paper to present them to a user as a table of communication control records.

However, in the case where the number of communication results is evenly determined to 25 because of restriction of the memory capacity of RAM as in the aforesaid prior art, if for example, a recording paper used is a rolled paper of B4 format, the recording paper is cut in length of A4 size, which is inconvenience when a printed table of communication control records is filed. In addition, in this case, if the recording paper used is a cut paper of B4 size, the cut paper is to have a wasteful margin on the lower edge thereof.

On the other hand, in the case where the memory capacity of RAM is increased so that the number of communication results is evenly determined to 36, for example, and if the recording paper used is a cut paper of A4 size, one sheet is not sufficient and two sheets are required. This poses a disadvantage that a wasteful margin is formed on the second page.

OBJECT AND SUMMARY OF THE INVENTION

In view of the aforementioned circumstances, it is an object of the present invention to provide a facsimile apparatus which produces no margin on a recording paper in the communication control recording.

For solving the aforementioned task, the present invention provides a facsimile apparatus in which when the number of communication results reaches a predetermined number, the communication results are recorded on a recording paper, characterized by the provision of means for setting the predetermined number according to the size of the recording paper used.

According to the aforementioned structure, when the size of a recording paper used is for example, B4 format, the number (for example, 36) just received in the recording paper of B4 is set as a predetermined number, and when the size is a letter size, the number (for example, 28) just received in the recording paper of the letter size is set as a predetermined number. Accordingly, the disadvantage of the conventional apparatus in which a predetermined number is evenly set, that is, the disadvantage that a wasteful margin is formed on the recording paper is overcome.

BRIEF DESCRIPTION OF THE DRAWINGS

FIGS. 1 to 3 show one embodiment of the present invention. FIG. 1 is a schematic view of a facsimile apparatus; FIG. 2 is a flowchart showing the process for printing-out communication control records according to the record start number set according to the sizes of the recording paper; and FIG. 3 illustrates a table of the communication control records.

DETAILED DESCRIPTION OF PREFERRED EMBODIMENT

One embodiment of the present invention will be described hereinafter with reference to FIGS. 1 to 3.

Figure 1:
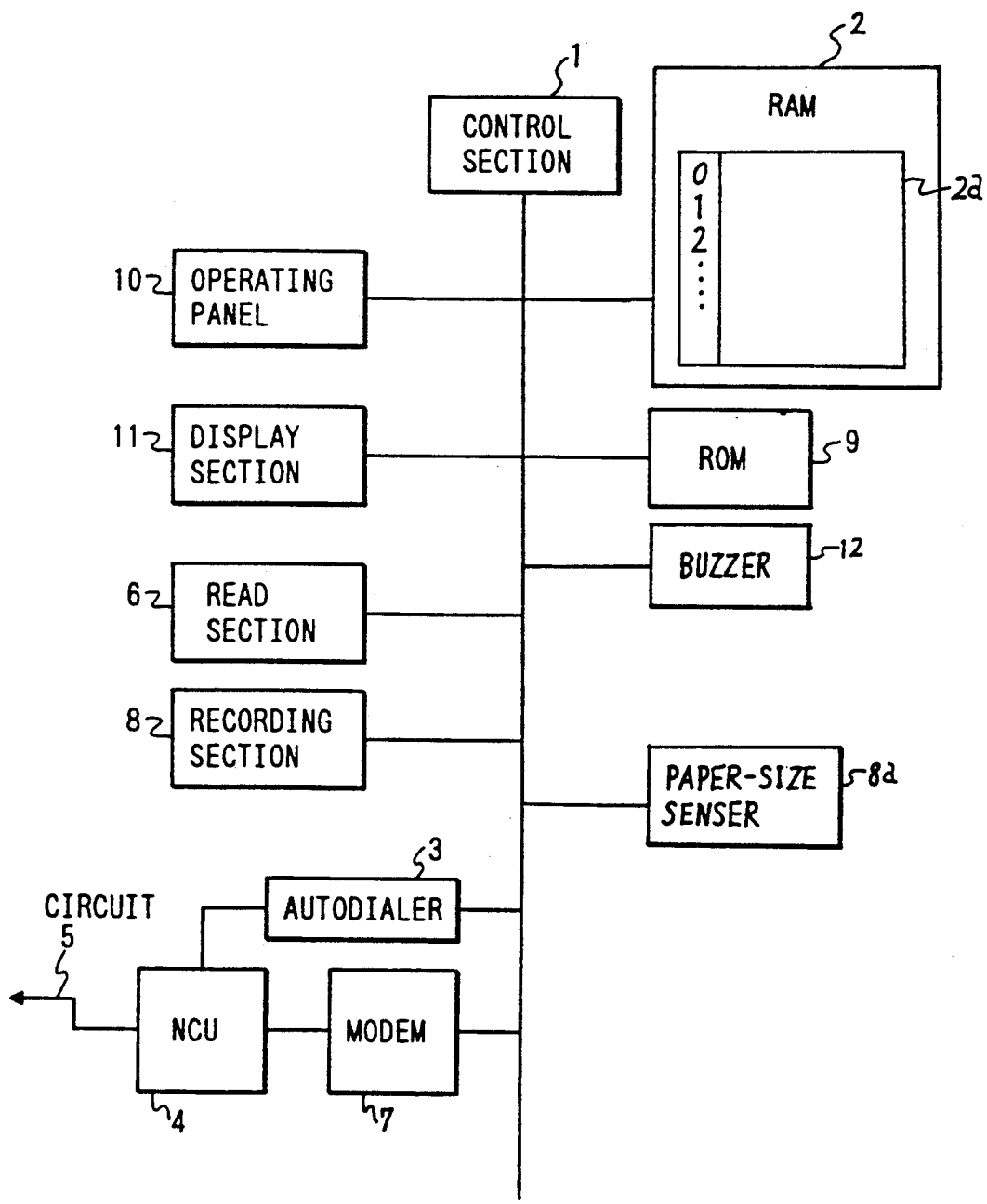

FIG. 1 is a block diagram showing a schematic circuit representation of a facsimile apparatus. The facsimile apparatus comprises a control section 1, a RAM 2, an auto-dialer 3, an NCU 4, a read section 6, a MODEM 7, a recording section 8, a paper-size sensor 8a, a ROM 9, an operating panel 10, a display section 11 and a buzzer 12.

The aforesaid control section 1 constitutes a control center for controlling the whole transmit-receiving operation of the facsimile apparatus in response to the control programs stored in the ROM 9. The basic transmit-receiving operation is briefly carried out in the following procedure.

When a communication key or one-touch dial key (not shown) is turned ON by an operator, the control section 1 reads a telephone number of the other party stored in the RAM 2 to dial-transmit the thus read telephone number to a telephone circuit 5 through the auto-dialer 3 and NCU 4. After the dial transmission, image data of an original read by the read section 6 is delivered to the telephone circuit 5 through the MODEM 7 and NCU 4, and the transmission operation is carried out.

On the other hand, the receiving operation is carried out in the following procedure.

That is, when receiving information is received from the other party through the telephone circuit 5, NCU 4 and MODEM 7, the control section 1 drives a printer to record the receiving information, and the receiving operation is carried out.

In the facsimile apparatus, whenever the aforementioned transmission operation and receiving operation are executed, the communication results are recorded as communication control records in RAM 2, and when the number of communication results reaches a predetermined number (hereinafter referred to as a record start number), a printer is driven so that the communication results are recorded on a recording paper as a table of communication control records as shown in FIG. 3, for example. The aforesaid record start number may be changed and set according to a key input by the operator or the size of a recording paper detected by a paper-size sensor 8a.

The relationship between the size of recording paper used and the record start number is shown as given in Table 1 below.

TABLE 1

| Size of recording paper | B4 | A4 | Regal | Letter |
| --- | --- | --- | --- | --- |
| Record start number | 36 | 30 | 35 | 28 |

While the record start number shown in Table 1 is the number just received in the recording paper used, it is to be noted that the aforesaid number is illustrative, and the number may be changed according to character sizes, recording formats and the like.

Figure 2A:
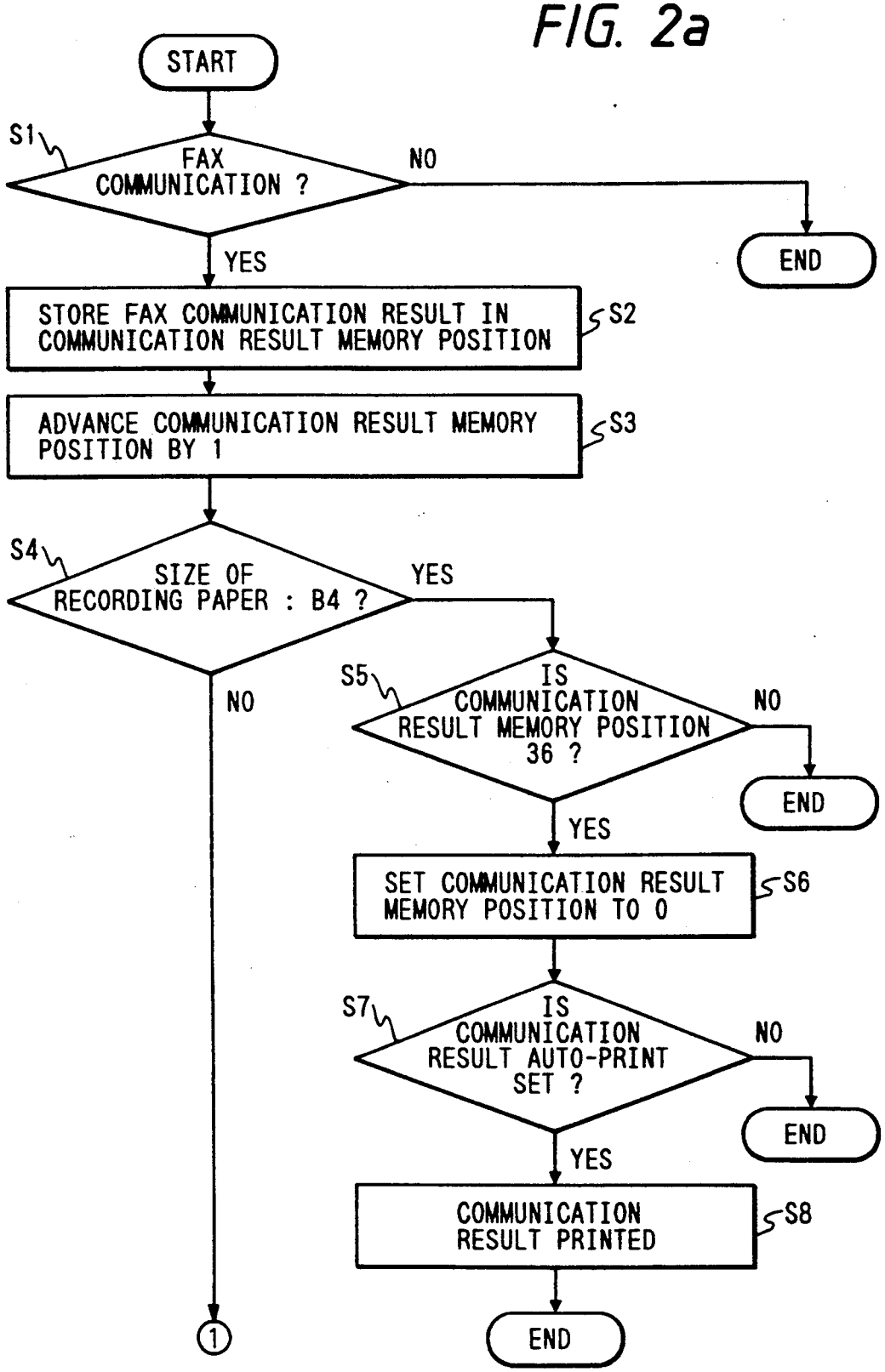
Figure 2B:
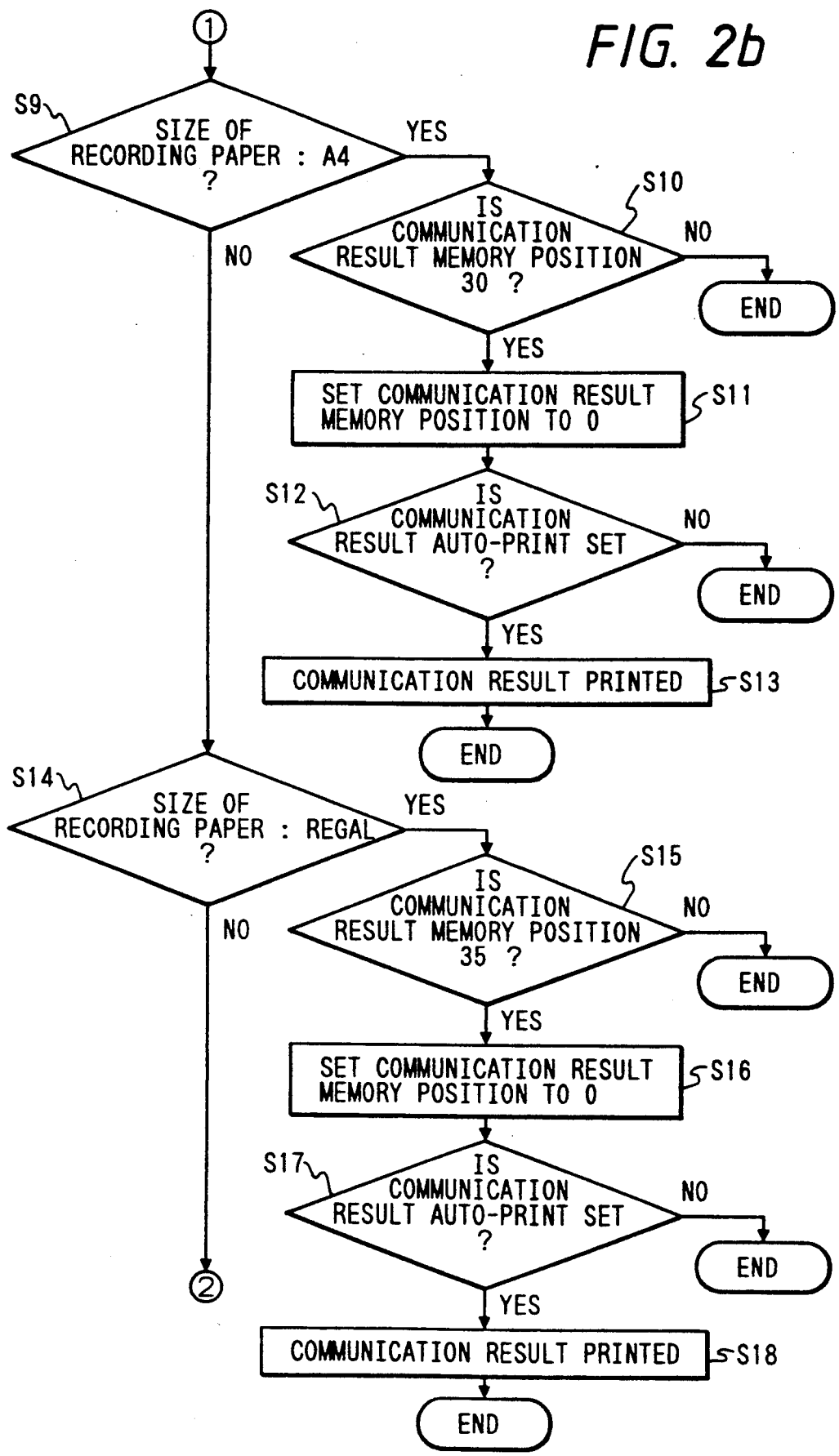

FIG. 2 is a flowchart showing the process for printing-out communication control records according to the record start number set according to the recording sizes.

In Step 1, judgement is made whether communication (transmission or reception) is present. If communication is present, the communication result is stored in a predetermined memory region 2a of RAM 2 (S2), and a communication result memory position on RAM 2 advances by 1.

Next, judgement is made if the size of recording paper is B4 size (S4). If it is B4 size, judgement is made if the communication result memory position is 36 (that is, if the communication result number is 36) (S5). If it is not 36, the operation is terminated. If it is not 36, the operation is terminated. If it is 36, the communication result memory position is set to 0 (S6). Then, judgement is made if a communication result automatic print is set (S7). If it is not set, the operation is terminated. If it is set, the communication result is printed out (S8).

In Step 4, when judgement is made so that the size of recording paper is not B4 size, judgement is made if the size of recording paper is A4 size (S9). If judgement is made so that it is A4 size, judgement is made if the communication result memory result is 30 (S10). If it is not 30, the operation is terminated, and if it is 30, the communication result recording position is set to 0 (S11). Next, judgement is made if the communication result auto-print is set (S12). If it is not set, the operation is terminated, and if it is set, the communication result is printed out (S13).

In Step 9, when judgement is made so that the size of recording paper is not A4 size, judgement is made if the size of recording paper is Regal size (S14). If judgement is made so that it is Regal size, judgement is made so that the communication result memory position is 35 (S15). If it is not 35, the operation is terminated whereas if it is 35, the communication result memory position is set to 0 (S16). Then, judgement is made if the communication result auto-print is set (S17). If it is not set, the operation is terminated whereas if it is not set, the communication result is printed out (S18).

In Step 14, when judgement is made so that the size of recording size is not Regal size, the recording paper is the letter size, and therefore, judgement is made if the communication result memory position is 28 (S19). If it is not 28, the operation is terminated whereas if it is 28, the communication result recording position is set to 0 (S20). Subsequently, judgement is made if the communication result auto-print is set (S21). If it is not set, the operation is terminated whereas if it is set, the communication result is printed out (S22), after which the operation is terminated.

The basic flow has been described. For example, in the case where the recording paper is changed from A4 size to letter size after the number of communication result has exceeded 28, the communication results for 28 are printed out, and the remaining portions may be kept stored. In a case where for example, the user desires that the communication results are printed out on A4 size recording paper, the size of recording paper maybe designated by a recording-paper size designation key or the like so that when reaching the number of recording results corresponding to the A4 size, A4 size is set, then this is printed out whereas when A4 size is not set, the operator is urged to replace the recording paper by way of a buzzer 12 or the like is to be effected.

According to the present invention as described above, the record start number just received in the recording paper of the size of a recording paper to be used, thus affording the effect which can overcome the disadvantage of the conventional apparatus by which the record start number is evenly set, that is, the disadvantage that a wasteful margin is formed on the recording paper.

What is claimed is:

1. A facsimile device, comprising:
recording means for recording a plurality of communication results on paper, the paper having a size,
sensing means for sensing the size of the paper,
activation means for activating the recording means when the plurality of communication results is equal to a predetermined number, and
selection means for selecting the predetermined number based upon the size of the paper sensed by the sensing means,
whereby the plurality of communication results are recordable on the paper without unwanted blank spaces regardless of the size of the paper.

2. The device of claim 1, further comprising:
signal means for generating a signal indicating that the size of the paper and the predetermined number do not coincide.

3. The device of claim 1, further comprising:
storage means for storing a plurality of communication results in excess of the plurality of communication results that are recordable on the paper.

4. A process for recording a plurality of facsimile communication results on paper, the paper having a size, the process comprising:
sensing the size of the paper,
selecting a predetermined number based upon the sensed size of the paper, and
activating a recording means for recording the plurality of communication results on the paper when the plurality of communication results is equal to the predetermined number,
whereby the plurality of communication results are recordable on the paper without unwanted blank spaces regardless of the size of the paper.

5. The process of claim 4, comprising:
storing at least one of the plurality of communication results in a predetermined memory region,
advancing a communication result memory position by one,
determining whether the communication result memory position corresponds to the predetermined number,
printing the communication result, and
setting the communication result memory to zero.

* * * * *